July 4, 1961 L. P. PÅLSSON 2,990,900
TURNING-CONTROL DEVICE FOR A TRACK-LAYING VEHICLE
Filed Aug. 5, 1959 2 Sheets-Sheet 2

INVENTOR.
LENNART PAUL PÅLSSON
BY
ATTORNEYS

United States Patent Office 2,990,900
Patented July 4, 1961

2,990,900
TURNING-CONTROL DEVICE FOR A TRACK-LAYING VEHICLE
Lennart Paul Pålsson, Bofors, Sweden, assignor to Aktiebolaget Bofors, Bofors, Sweden, a Swedish company
Filed Aug. 5, 1959, Ser. No. 831,883
Claims priority, application Sweden Aug. 7, 1958
3 Claims. (Cl. 180—6.48)

The present invention relates to a turning-control device for a track-laying vehicle, and more particularly for a track-laying vehicle equipped with a special drive means to effect, for purpose of turning, longitudinal track movement relative to the chassis of the vehicle.

It is known to steer track-laying vehicles such as military tanks, mounts for heavy guns and earth moving equipment through a curve by braking only one of the two tracks of the vehicle. It is also known to effect turning within the smallest possible radius by driving the two tracks in opposite direction but at equal speed.

It is an object of the present invention to provide a novel and improved turning control device for track-laying vehicles of the general kind above referred to, by means of which the turning angle of the vehicle can be accurately controlled.

Another object of the invention is to provide a novel and improved turning control device for track-laying vehicles of the general kind above referred to, by means of which turning of the vehicle can be readily effected at a uniform rate of speed.

Still another object of the invention is to provide a novel and improved turning control device for track-laying vehicles of the general kind above referred to, by means of which the turning rate of the vehicle is automatically so controlled that it is substantially independent of the different frictional resistance which the two tracks may encounter during the turning due to the nature of the ground upon which the vehicle rests.

Broadly speaking, the invention resides in coupling special drive means for effecting the relative track movement for purpose of turning with a control assembly including a hydraulic system controllable for delivering a predetermined volume of pressure fluid to said drive means, substantially independent of variations in the turning resistance which the tracks may encounter.

Further objects, features and advantages of the invention will be pointed out hereinafter and set forth in the appended claims constituting part of the application.

In the accompanying drawing, several preferred embodiments of the invention are shown by way of illustration and not by way of limitation.

Figure 1:
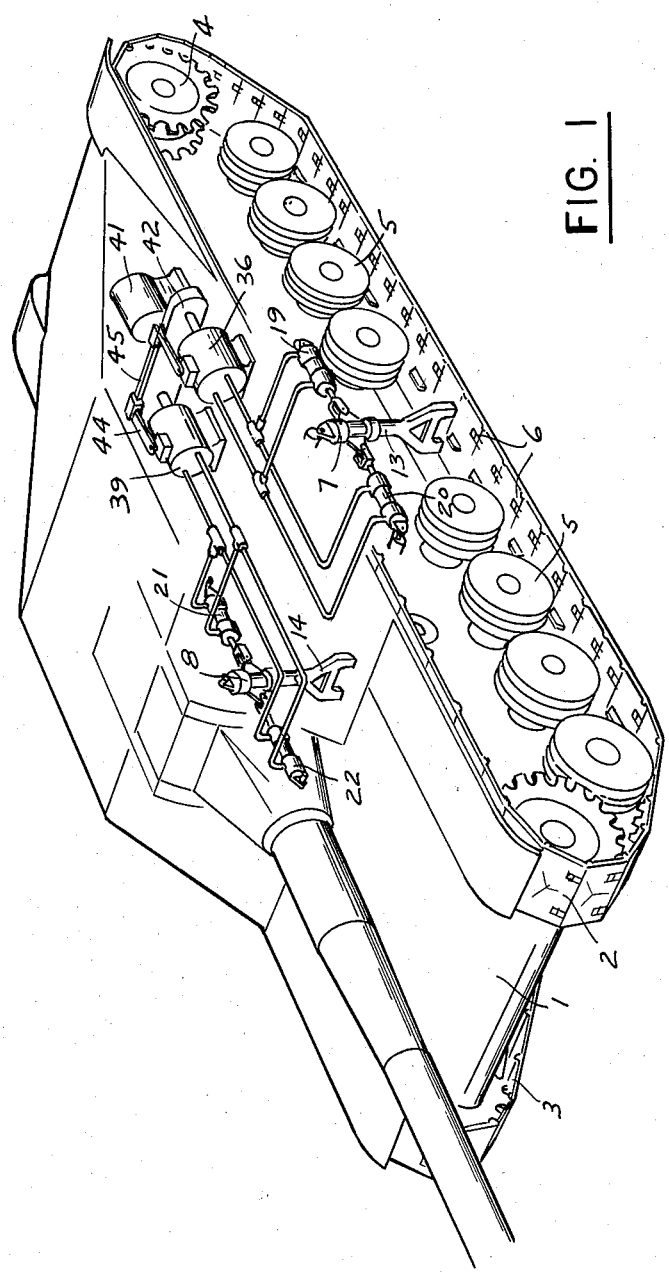
FIG. 1 is a perspective view of a tank having a track-laying chassis, equipped with a control assembly according to the invention.

Referring now to the figures in detail, FIG. 1 shows a tank, and more specifically the chassis thereof. The chassis is equipped with two longitudinally parallel tracks 2 and 3 which are each driven by a sprocket 4. The chassis rests upon the tracks by means of interposed support rollers 5. The track plates of which the tracks are composed, have sprocket holes 6 engageable with the teeth of sprockets 4. Normal drive of the tank is effected by means of sprockets 4 which in turn are driven by a suitable engine, the arrangement of which is not essential for the understanding of the invention and should be visualized as being conventional.

Figure 2:
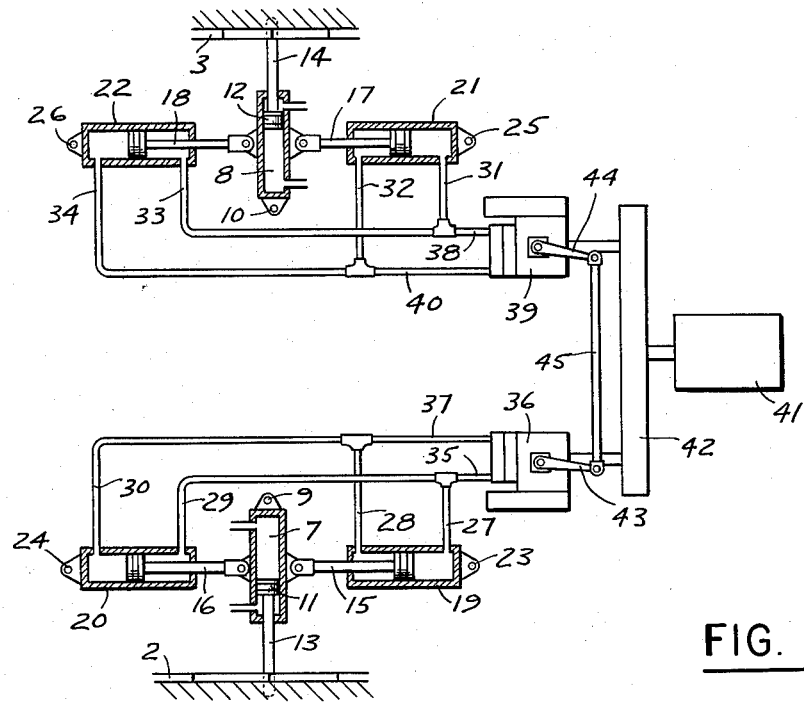
FIG. 2 is a diagrammatic view of the turning-control assembly.

The turning control assembly for the tank comprises hydraulic cylinders 7 and 8, one for each track. Each of the cylinders is longitudinally pivotal in either longitudinal direction about pivot studs 9 and 10 respectively, which in turn are suitably mounted on the chassis. A plunger 11 is slidable in cylinder 7 and similarly, a plunger 12 is slidable in cylinder 8. The plungers are mounted on rods 13 and 14 respectively which are forked at their free ends. The prongs of the forks are engaged with sprocket holes 6 in the track plates, or can be withdrawn therefrom. As is apparent, engagement with or disengagement from the sprocket holes is controlled by the position of plungers 11 and 12 which in turn may be hydraulically controlled. Conduits for admitting pressure fluid into and discharging from cylinders 7 and 8 are indicated in FIG. 2, but the specific arrangement of the control of the plunger condition does not constitute part of the invention and is not essential for the understanding of the same.

Figure 3:
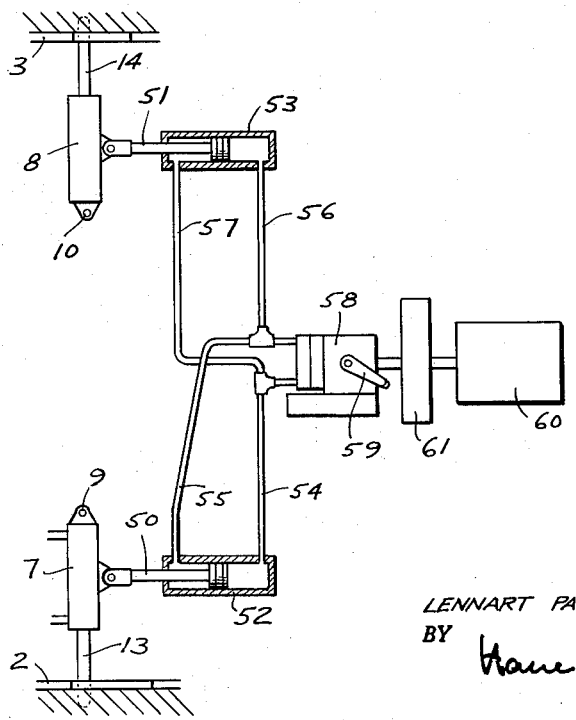
FIG. 3 is a modification of the control assembly.

Cylinder 7, plunger 11, rod 13 and cylinder 8, plunger 12, rod 14 each constitute a drive means for the respective track 2 or 3. The rods 13, 14 do not function when the sprocket 4 is activated through the usual drive. Also, the sprocket 4 is driven through a slip coupling of any desired type which will allow it to rotate freely when not in action. FIGS. 2 and 3 show the drive assembly turned through 90° to simplify the illustration, but as is evident from FIG. 1, both rods are disposed to coact with the track portions with which the tank rests upon the ground. As is further evident, pivotal movement of the cylinder-rod assembly in either longitudinal direction will effect a corresponding movement of the engaged track.

To effect the pivotal or driving movement of the drive means, cylinder 7 is associated with actuating cylinders 19 and 20 and cylinder 8 is associated with actuating cylinders 21 and 22. A piston is slidable in each of the cylinders. The piston of cylinder 19 is linked to cylinder 7 by means of a piston rod 15 and the piston in cylinder 20 is linked to cylinder 7 by means of a piston rod 16. Similarly, the piston in cylinder 21 is linked to cylinder 8 by means of a piston rod 17 and the piston in cylinder 22 by means of a piston rod 18. The actuating cylinders 19 to 22 themselves are pivotal about pivot shafts 23 through 26 which in turn are secured at the sides of the chassis of the vehicle.

The actuating cylinders associated with each drive means are connected to a closed conduit system. More specifically, the right hand sides of cylinders 19 and 20 are connected by conduits 27 and 29 to one conduit 35 of a reversible pump 36. Similarly, the left hand sides of cylinders 19 and 20 are connected by conduits 28 and 30 to the second conduit of pump 36. The right hand sides of cylinders 21 and 22 are connected by conduits 31 and 33 to one conduit 38 of a second reversible pump 39 and the left hand sides of the cylinders are connected by conduits 32 and 34 to the second conduit 40 of pump 39.

Pumps 36 and 39 should be visualized as pumps of conventional design, the volume output of which can be controlled. Piston pumps with variable length of stroke have been found suitable for the purpose of the invention. The two pumps are symmetric and are driven from a common motor 41, preferably through a transmission 42. The control equipment of the two pumps is coupled. It is indicated by control levers 43 and 44 which are ganged by means of a rod 45. Joint actuation of levers 43 and 44 by means of rod 45 will vary the output volume and the pumping direction in the same manner.

The assembly as hereinbefore described, operates as follows:

Let it be assumed that the vehicle is at a standstill and that driving rods 13 and 14 are operated to engage holes 6 in the underlying track plates. Let it further be assumed that levers 43 and 44 are so positioned that the pumps do not pump any pressure fluid such as oil into the respective conduit system.

When it is now desired to turn the tank with the smallest possible radius, levers 43 and 44 are moved into the position shown in FIG. 2, in which oil is delivered to conduits 35 and 40 at a given volume per unit of time. At the same time, an equal volume is withdrawn through conduits 37 and 38. As a result, the oil fed into cylinders 19 and 20 through conduits 27 and 29 and into cylinders 21 and 22 through conduits 32 and 34 will pivot cylinder 7 and with it rod 13 towards the left and cylinder 8 and with it rod 14 towards the right (both as seen in FIG. 2). Consequently, the resulting movement of the tracks in opposite direction will cause the tank to turn about a turning center located approximately at the mid-distance between the two tracks. Accordingly, the tank will turn substantially on the spot.

As is apparent, the turning angle is limited by the angle through which rods 13 and 14 can be pivoted without losing engagement with the sprocket holes. If a greater turning angle is to be effected, rods 13 and 14 may be disengaged from the holes and the tilting of cylinders 7 and 8 is reversed by operating the two pumps until rods 13 and 14 can engage with another set of holes in the tracks. Wider turns can, of course, be effected by means of the standard driving machinery of the vehicle.

FIG. 3 shows a somewhat simplified turning control assembly employing the same principle as explained in connection with FIG. 2. The driving means of FIG. 3 are the same as in FIG. 2 and hence designated by the same reference numerals.

According to FIG. 2, cylinders 7 and 8 are pivotal by means of rods 50 and 51 mounted on pistons or plungers slidable in cylinders 52 and 53 respectively. The two cylinders are cross-wise connected in a common closed conduit system also including a pump 58 which again may be visualized as a piston pump with a stroke of variable length. The right hand side of piston 52 is connected by a conduit 54 to one conduit of pump 58 to which is also connected the left hand side of cylinder 53 by a conduit 57. Similarly, the left hand side of cylinder 52 is connected by a conduit 55 to the other conduit of pump 58 to which is also connected the right hand side of cylinder 53 by a conduit 56. As is apparent, fluid pressure delivered by the pump will pivot both cylinders 7 and 8 but in opposite direction.

Pump 58 is driven by a motor 60 through a transmission 61. The pumping direction and volume of oil or other pressure fluid delivered per unit of time are controlled by means of a lever 59.

In the position of FIG. 3, rods 13 and 14 are in engagement with sprocket holes in the tracks and control lever 59 is assumed to be in a position in which oil is pumped into conduits 54 and 57 and withdrawn through conduits 55 anl 56. Consequently, rod 13 will be forced towards the left with an approximately uniform speed and rod 15 will be forced towards the right at the same rate of speed.

Such uniform motion of the two rods will occur if the resistance which the two piston rods 50 and 51 experience is approximately equal, or in other words, if the ground conditions are such that both tracks encounter substantially the same resistance to movement. However, if for instance, it is more difficult to move track 2 and rod 50 than to move track 3 and rod 51, rod 50 will remain more or less at standstill whereas rod 51 is displaced at substantially double speed. As a result, the turning rate of speed of the vehicle as such will remain unchanged, but the center of turning of the vehicle will move from the center position between the tracks toward the track with which rod 13 coacts. In such case, the turning radius is somewhat larger than previously described but still considerably smaller than the turning radius previously obtainable.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An assembly for use in connection with a tracklaying vehicle having two parallel tracks to effect controlled turning of the vehicle, said assembly comprising for each track a drive means operable by pressure fluid and drivingly engageable with the respective track, each of said drive means being movable in either longitudinal direction of the tracks to impart movement to the respective track in a selected longitudinal direction, a closed conduit system for each of said drive means, each of said conduit systems conducting pressure fluid and communicating with the respective drive means for supplying pressure fluid to the same a variable stroke pump means connected to each of said conduit systems, a control means for each of said pump means to control the direction and the volume of the fluid flow within the respective conduit system, and link means interconnecting said two control means to control both pump means to deliver an equal volume of fluid but in opposite direction into the respective conduit system whereby both drive means and the associated tracks are moved through the same distance and at the same rate of speed but in opposite direction.

2. An assembly according to claim 1 and further comprising a cylinder-piston arrangement disposed on opposite longitudinal sides of each of said drive means, each of said pistons being linked to the respective drive means for moving the same in accordance with a piston movement, said conduit system being connected to deliver fluid to one cylinder of each arrangement and to discharge it from the other cylinder of the same arrangement, alternate cylinders of the two arrangements being supplied with pressure fluid whereby said movements of the drive means in opposite direction are effected.

3. An assembly for use in connection with a tracklying vehicle having two parallel tracks to effect controlled turning of the vehicle, said assembly comprising for each track a drive means operable by pressure fluid and drivingly engageable with the respective track, each of said drive means being pivotally supported for movement in either longitudinal direction of the tracks, a closed conduit system for each of said drive means, each of said conduit means conducting pressure fluid and communicating with the respective drive means for supplying pressure fluid to the same, a variable stroke pump means connected to each of said conduit systems, a control means for each of said pump means to control the direction and volume of the fluid flow within the respective conduit system, and link means interconnecting said two control means to control both pump means to deliver an equal volume of fluid but in opposite direction into the conduit systems whereby both drive means are pivoted through the same angle and at the same rate of speed but in opposite direction to effect a corresponding movement of the tracks.

References Cited in the file of this patent

UNITED STATES PATENTS

| | | |
|---|---|---|
| 1,490,056 | Wostenberg | Apr. 8, 1924 |
| 2,586,630 | Erland et al. | Feb. 19, 1952 |
| 2,620,060 | Bird | Dec. 2, 1952 |
| 2,943,726 | Granath | July 5, 1960 |